(12) United States Patent
Wang et al.

(10) Patent No.: US 11,675,873 B1
(45) Date of Patent: Jun. 13, 2023

(54) WEBSITE SIMILARITY DETERMINATION

(71) Applicant: Lemon Inc., Grand Cayman (KY)

(72) Inventors: Han Wang, Los Angeles, CA (US); Hongyu Xiong, Los Angeles, CA (US); Zheng Chen, Los Angeles, CA (US); Tianyu Zhang, Los Angeles, CA (US); Yiqi Feng, Los Angeles, CA (US); Yuan Gao, Los Angeles, CA (US); Xiangyu Zeng, Los Angeles, CA (US); Rui Li, Los Angeles, CA (US); Qingyi Lu, Los Angeles, CA (US); Yihan Yang, Los Angeles, CA (US); Yu Zhang, Los Angeles, CA (US); Bin Liu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/809,513

(22) Filed: Jun. 28, 2022

(51) Int. Cl.
    *G06F 16/958* (2019.01)
    *G06F 16/954* (2019.01)

(52) U.S. Cl.
    CPC .......... *G06F 16/958* (2019.01); *G06F 16/954* (2019.01)

(58) Field of Classification Search
    CPC .............................. G06F 16/958; G06F 16/954
    USPC ........................................................ 715/234
    See application file for complete search history.

(56) References Cited

U.S. PATENT DOCUMENTS

| | | | | |
|---|---|---|---|---|
| 8,146,012 | B2* | 3/2012 | Ramanathan | G06F 16/954 715/776 |
| 10,824,682 | B2* | 11/2020 | Alvares | H04L 67/02 |
| 2011/0061026 | A1* | 3/2011 | Ramanathan | G06F 16/954 715/833 |
| 2011/0225173 | A1* | 9/2011 | Gulhane | G06V 20/635 707/E17.069 |
| 2012/0005207 | A1* | 1/2012 | Gulhane | G06F 16/9535 707/E17.014 |

(Continued)

FOREIGN PATENT DOCUMENTS

CN     113297449 A      8/2021

OTHER PUBLICATIONS

Mozhgan et al., A Webpage Similarity Measure for Web Sessions Clustering Using Sequence Alignment, published 2011 via IEEE, pp. 20-24.*

(Continued)

*Primary Examiner* — Manglesh M Patel
(74) *Attorney, Agent, or Firm* — ArentFox Schiff LLP (57) ABSTRACT

There are provided methods, devices, and computer program products for similarity determination. In a method, first and second access data are obtained for a first and a second group of users who access a first and a second website, respectively. A first and a second jump path are generated for the first and second groups of users based on the first and second access data, respectively. The first and second jump paths describe access history for the first and second groups of users among webpages in the first and second websites, respectively. A similarity is determined between the first and second websites based on the first and second jump paths. Here, access data are used for similarity determination and unvisited webpages are not considered in the similarity determination. Therefore, the computation workload may be lowered, and the noise caused by the unvisited webpages may be reduced.

20 Claims, 5 Drawing Sheets

(56) References Cited

U.S. PATENT DOCUMENTS

| | | | | |
|---|---|---|---|---|
| 2013/0204860 A1* | 8/2013 | Gabara | ............... | G06F 16/9535 |
| | | | | 707/E17.108 |
| 2013/0205004 A1* | 8/2013 | Gabara | ................ | G06F 16/957 |
| | | | | 709/224 |
| 2015/0324091 A1* | 11/2015 | Jiao | .................... | G06F 3/04842 |
| | | | | 715/765 |
| 2020/0294071 A1* | 9/2020 | Christensen | ...... | G06F 16/24578 |

OTHER PUBLICATIONS

Jiang et al. "(1996). Including Geometry in Graph Representations: A Quadratic-time Graph Isomorphism Algorithm and Its Applications," Dept. of Computer Science, Univ of Bern, 1996 (pp. 110-119).

Hopcroft et al., "Linear Time Algorithm for Isomorphism of Planar Graphs (Preliminary Report)," In Proceedings of the sixth annual ACM symposium on Theory of computing, 1974 (pp. 172-184).

Cha, "Comprehensive Survey on Distance/Similarity Measures Between Probability Density Functions," City, 1(2), 2007 (pp. 1-8).

\* cited by examiner

WEBSITE SIMILARITY DETERMINATION

FIELD

The present disclosure generally relates to website management, and more specifically, to methods, devices, and computer program products for determining a similarity between websites.

BACKGROUND

With developments of the computer and network technology, a large number of websites have been built. Usually, the website may include a large number of webpages and have a complex structure. Nowadays, technical solutions have been developed to determine whether two websites are similar or not based on topology graphs of the websites. However, these solutions involve complex computations and may be interfered with by a variety of factors, and thus they cannot accurately determine the similarity between the websites. At this point, it is desired to provide a simpler and more efficient way to determine the website similarity.

SUMMARY

In a first aspect of the present disclosure, there is provided a method for determining a similarity between a first website and a second website. In the method, first access data and second access data are obtained for a first group of users and a second group of users who access the first web site and the second web site, respectively. A first jump path and a second jump path are generated for the first group of users and the second group of users based on the first access data and the second access data, respectively. Here, the first jump path describes an access history for the first group of users among a first group of webpages in the first website, and the second jump path describes an access history for the second group of users among a second group of webpages in the second website. A similarity between the first web site and the second web site is determined based on the first jump path and the second jump path.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features, and advantages of the present disclosure will become more apparent, wherein the same reference generally refers to the same components in the implementations of the present disclosure.

DETAILED DESCRIPTION

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

Figure 1:
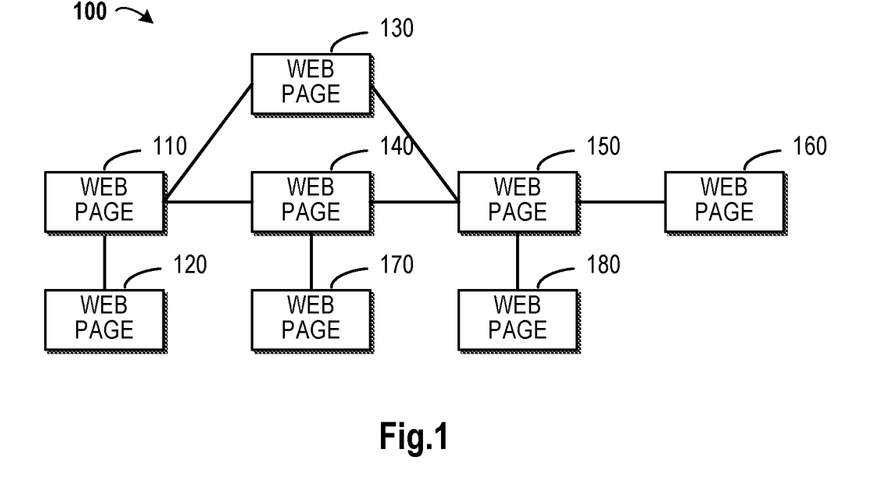
FIG. 1 illustrates an example structure for a website to which implementations of the present disclosure may be applied.

Referring to FIG. 1 for a general description of a website. FIG. 1 illustrates an example structure for a website 100 to which implementations of the present disclosure may be applied. As shown in FIG. 1, the website 100 include a plurality of webpages 110, 120, 130, 140, 150, 160, 170, and so on. Here, an edge between two webpages indicates a link between the two webpages.

Multiple solutions have been proposed for determining a similarity between two websites based on a comparison between topology graphs of the two websites. However, the website may include more than 100,000 webpages, and thus the topology graph for the website may have a significant complex structure. At this point, the comparison between topology graphs with countless nodes may lead to huge computation workload and an unacceptable time cost. Taking two online shopping websites as examples, supposing the first website involves 10,000 webpages for selling 10,000 products, while the second website involves 1,000 webpages for selling 1,000 products. Based on the topology graph comparison, the two websites are completely different. However, from the perspective of a common shopper, the two online shopping web sites are almost the same, with the only difference that the numbers of products provided by the two websites are different.

Further, most users only visit a portion of the webpages, and a great number of webpages are seldom or even never accessed by the users. Even if the webpages that are seldom or never accessed do affect the users' behavior in the website, these webpages may greatly affect the similarity between the two websites. At this point, it is desired to propose a technical solution for determining the similarity between websites in a more accurate and effective way.

Figure 2:
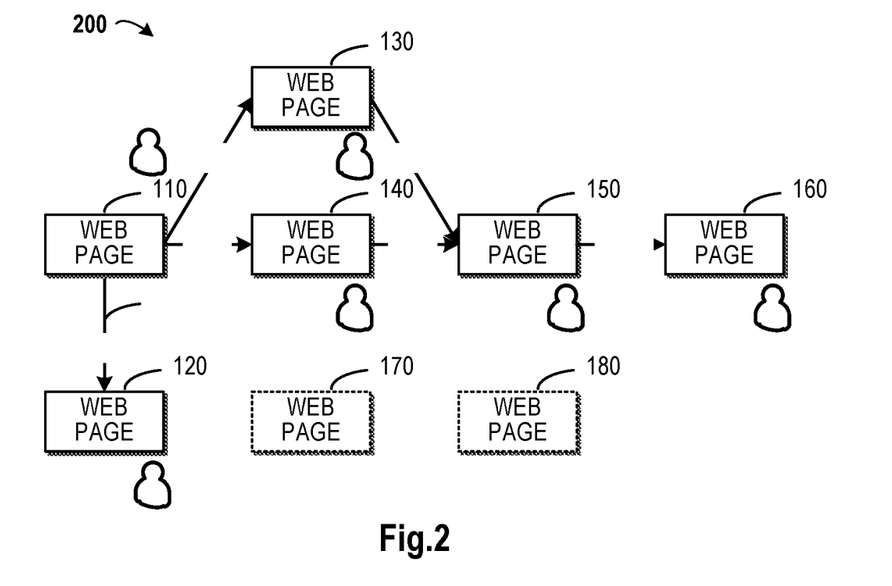
FIG. 2 illustrates an example diagram for access data for users who access webpages in the website according to implementations of the present disclosure.

In view of the above, the present disclosure proposes a website similarity determination solution based on user access data. Reference will be made to FIG. 2 for a general description of the present disclosure, here FIG. 2 illustrates an example diagram 200 for access data for users who access webpages in the website according to implementations of the present disclosure. Here, operations to the two websites are similar and FIG. 2 shows the access data for only one website. As illustrated in FIG. 2, the access data may be obtained for a group of users who access the website. For example, FIG. 2 shows that 1,000 users access the webpage 110, 300 users access the webpage 120, 200 users access the webpage 130, 100 users access the webpage 140, 30 users access the webpage 150, and 20 users access the webpage 160. Here, an arrow between a predecessor webpage and a successor webpage indicates that one or more users jump from the predecessor webpage to the successor webpage via a link in the predecessor webpage.

As shown in FIG. 2, not all webpages in the website are accessed by the users. For example, no user accesses the webpages 170 and 180, and thus these webpages 170 and 180 are excluded from the access data and not considered in determining the similarity. In other words, webpages that are never accessed by the users may be filtered out and do not contribute to the website comparison.

Further, a jump path may be generated based on the access data. For example, 1,000 users access the webpage 110, and 300 users jump from the webpage 110 to the webpage 120. At this point, a jump 210 indicates that 300 out of 1,000 users jump from the webpage 110 to the webpage 120, and thus the jump probability is 300/1000=0.3. In FIG. 2, the jump path may include a serial of jumps as shown by arrows between the webpages, and then the jump path may further be used for determining the similarity.

Based on the operation as shown in FIG. 2, the first and second websites may be processed in a similar way. At this point, the first access data and the second access data may be obtained for a first group of users and a second group of users who access the first website and the second website, respectively. Further, based on the first access data and the second access data, a first jump path and a second jump path may be generated. Here the first jump path indicates the access history of the first group of users among the first group of webpages in the first website, and the second jump path indicates the access history of the second group of users among the second group of webpages in the second website. Then, the similarity between the first website and the second website may be determined based on the first jump path and the second jump path.

With these implementations, the access data for user who visit one or more webpages are used as a ground for the similarity determination, and thus the jump path (including only the accessed webpages) may represent a simplified topology structure of the website. Here, the simplified topology structure includes only valid webpages that are accessed by the users and do not include any invalid webpage that are never accessed by the users. Therefore, the jump path may remove noise caused by the unvisited webpages and further reduce the computation workload, such that the similarity determination may be implemented with less computation and time cost, together with an increased accuracy level.

Having provided the general description, the following paragraphs will provide more details about the present disclosure. In implementations of the present disclosure, access data may be obtained from a monitoring system of the website. Recently, various monitoring tools are provided for detecting the user access history in the website. It may be understood that access data (including but not limited to the data itself, the acquisition or use of the data) complies with requirements of corresponding laws and regulations and relevant rules. For example, the monitoring tool may detect that a user first accesses the webpage 110, and then jumps to the webpage 130 via a link in the webpage 110, and subsequently jumps to the webpage 150 via a link in the webpage 130, and so on. The access history of each user may be combined into the statistical data as shown in Table 1 as below.

TABLE 1

Association between Webpage and User Number

| No. | Webpage | User Number |
|---|---|---|
| 1 | Webpage 110 | 1000 |
| 2 | Webpage 120 | 300 |
| 3 | Webpage 130 | 200 |
| 4 | Webpage 140 | 100 |
| 5 | Webpage 150 | 150 |
| 6 | Webpage 160 | 160 |
| ... | | |

As shown in Table 1, the column "Webpage" indicates webpages that are accessed by the users, and the column "User Number" indicates the number of users who access the webpage. For example, Table 1 shows that 1,000 users access the webpage 110, 300 users access the webpage 120, and so on. Here, a webpage may have one or more links, via which the users may jump from the current webpage to another webpage. Here, the webpages 170 and 180 become noise data, they are excluded from Table 1 because the webpages 170 and 180 are not accessed by any user.

In implementations of the present disclosure, similar operations may be implemented on the to-be-compared websites. Specifically, the first access data for the first group of users is obtained for the first website, and the second access data for the second group of users is obtained for the second website. With these implementations, unimportant webpages are removed from the access data, and thus the computation workload may be reduced. Further, due to the similarity determination aiming at detecting user behaviors in different websites, removing the unvisited webpages 170 and 180 does not affect the user behaviors, and thus will not lower the accuracy level for the similarity determination.

Figure 3:
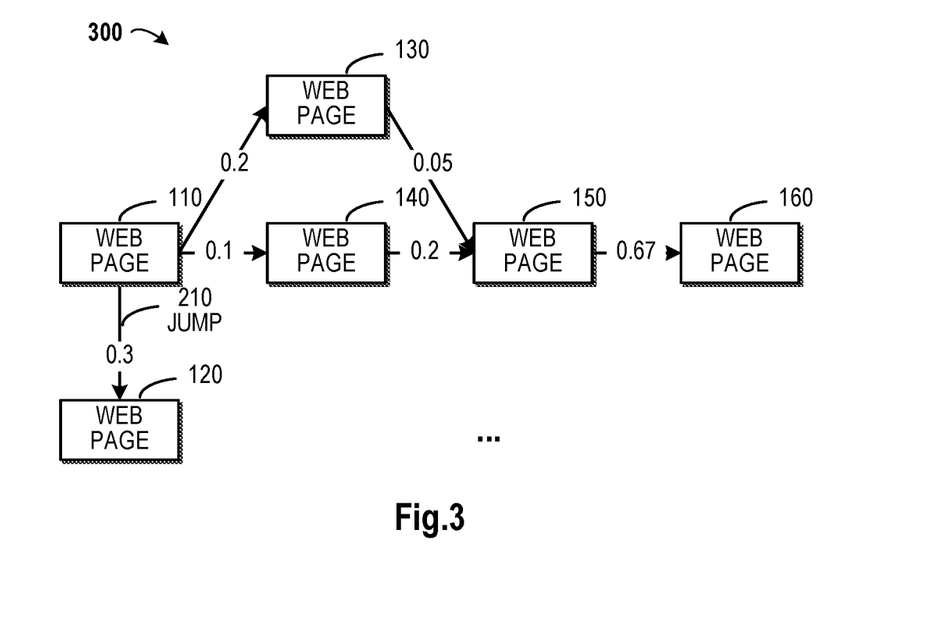
FIG. 3 illustrates an example diagram for a jump path for users who access webpages in the website according to implementations of the present disclosure.

Further, respective jump paths may be generated based on the respective access data, for indicating an access history for the users among a group of webpages in the website. Continuing the example as shown in FIG. 2, a jump path may be generated for the website 100. FIG. 3 illustrates an example diagram for a jump path 300 for users who access webpages in the website according to implementations of the present disclosure. As shown in FIG. 3, the jump path 300 may be represented by a directed acyclic graph. In the jump path 300, a node indicates a webpage in the website 100, and an edge between nodes indicates a jump from the predecessor webpage to the successor webpage, and a weight of the edge indicates a jump probability for the jump.

At this point, based on the statistical data as shown in Table 1, the number of predecessor users who access a predecessor webpage in the website may be determined. Further, the number of successor users who jump from the predecessor webpage to a successor webpage via a link in the predecessor webpage may also be determined, and then a jump may be generated based on the predecessor webpage, the successor webpage, the number of predecessor users, and the number of successor users. With implementations of the present disclosure, the jump path may be determined in an easy and effective way, and the jump path may work as a simplified version of the topological structure of the website. Further, compared with the conversional solution for obtaining the topological structure of the whole website by a spider tool, the jump path may represent a backbone structure of the website that are accessed by the users.

Taking the jump 210 between the webpage 110 (the predecessor webpage) and the webpage 120 (successor webpage) as an example, the jump probability may be determined by a comparison of the number of users who access the successor webpage and the number of users who access the predecessor webpage. At this point, the jump probability for the jump 210 is determined as 300/1000=0.3. Similarly, jump probabilities for other jumps may be determined in the same way.

Figure 4:
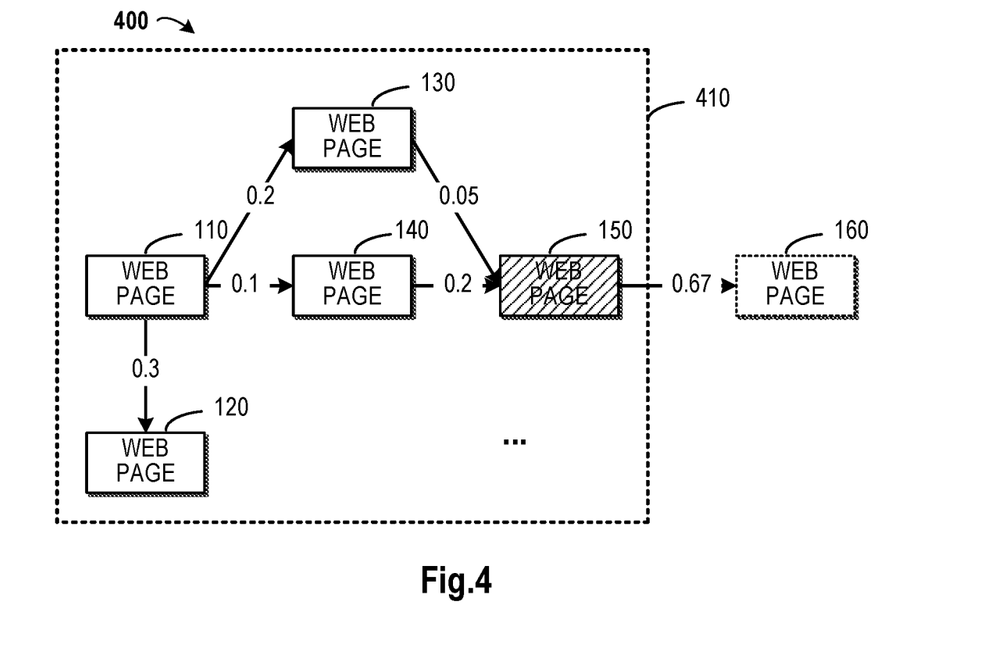
FIG. 4 illustrates an example diagram for simplifying a jump path based on a webpage of interest in the website according to implementations of the present disclosure.

In implementations of the present disclosure, a webpage of interest may be defined in advance depending on a purpose of the user behavior analysis. For example, if the purpose aims at finding a conversion webpage related to a register operation, a pay operation, and the like, then the conversion webpage may be defined as the webpage of interest. Referring to FIG. 4 for more details about the webpage of interest, here FIG. 4 illustrates an example diagram 400 for simplifying the jump path 300 based on a webpage of interest in the website according to implementations of the present disclosure. In FIG. 4, the webpage 150 is the webpage of interest, and thus the webpage 150 may be considered as an end of the jump path. When the webpage of interest is added into the jump path, the jump path determination may be terminated. In other words, during generating the jump path, if the webpage of interest work as the predecessor webpage, then the generating procedure may stop.

As shown in FIG. 4, the webpage 160 may be excluded from the original jump path 300, and the portion within the block 410 may be taken as the jump path for further processing. Although the above paragraph shows that the original jump path 300 is cut off according to the webpage 150 after the original jump path 300 is generated, alternatively and/or in addition to, the webpage of interest may used to filter the access data before generating the jump path 300. Specifically, webpages that are after the webpage of interest may be removed from the access data first. At this point, the jump path that is generated from the filtered access data may exclude the webpage 160, which may further reduce the computation workload of the similarity determination.

In implementations of the present disclosure, the jump path may be traversed, and a jump code may be determined for each jump in the jump path. Specifically, the traverse may start at the root node (for example, the webpage 110) of the jump path. In the first round, jumps 210, 520 and 522 (which is directly connected to the root node) may be processed. Further, in the second round, jumps starting from corresponding successor webpages (such as the webpages 120, 130 and 140) of the above processed jumps may be processed. At this point, all the jumps in the jump path may be processed gradually.

Figure 5:
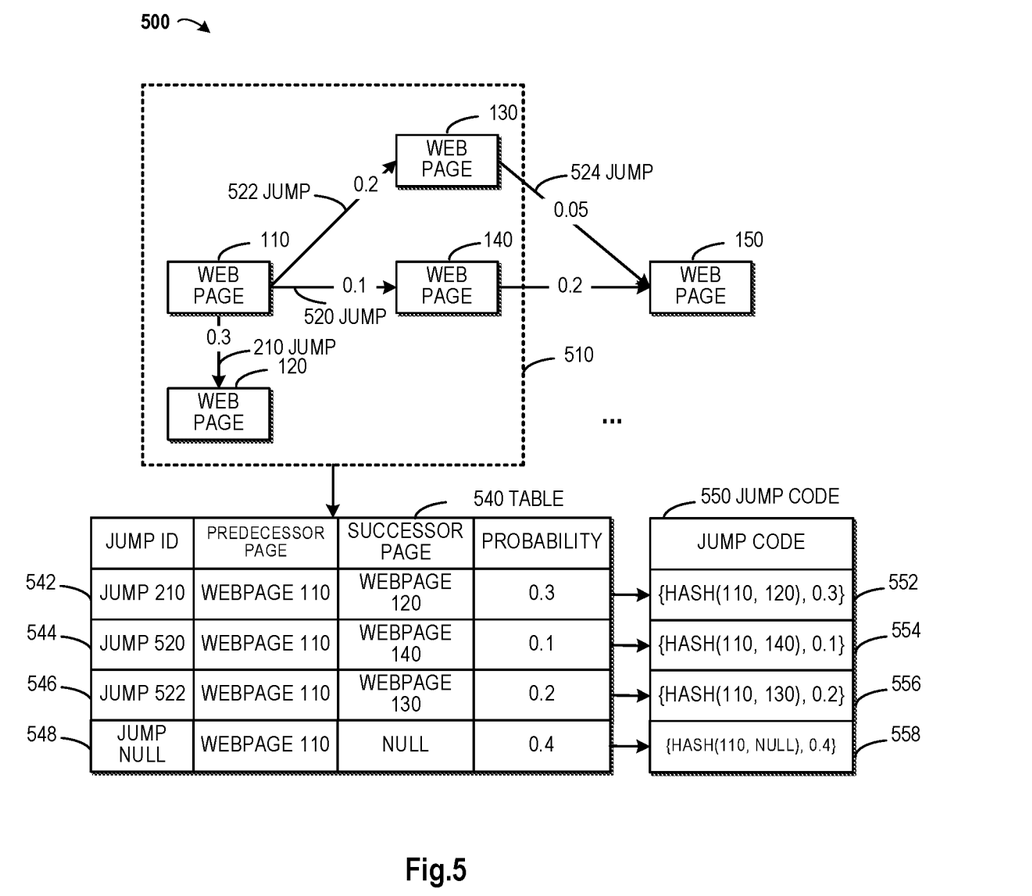
FIG. 5 illustrates an example diagram for generating jump codes for jumps in a jump path according to implementations of the present disclosure.

Referring to FIG. 5 for more details about the jump code determination, here FIG. 5 illustrates an example diagram 500 for determining jump codes for jumps in a jump path according to implementations of the present disclosure. In FIG. 5, the jump path includes multiple jumps and the following paragraphs will take the jumps 120, 520 and 522 in the block 510 as examples for the jump code determination. As shown in FIG. 5, the jump path may be represented in a table format, where the first column "JUMP ID" indicates an identification of the jump, the second column "PREDECESSOR PAGE" indicates a predecessor webpage of the jump, the third column "SUCCESSOR PAGE" indicates a successor webpage of the jump and the fourth column "PROBABILITY" indicates a jump probability of the jump.

In the table 540, the lines 542, 544 and 546 show data related to the jumps 210, 520 and 522, respectively, and the line 548 show data related to another situation (represented as "NULL") for the webpage 110, which indicates that the users do nothing and stop the visit at the webpage 110. At this point, the probability of "JUMP NULL" may be determined as (1−0.3−0.1−0.2)=0.4. It is to be understood that the table 540 just provides an example for the portion within the block 510 in the jump path. For other jumps outside the block 510, more lines may be added into the table 420. For example, with respect to the jump 524, a new line may be added: (JUMP 524, WEBPAGE 120, WEBPAGE 150, 0.05). Other jumps in FIG. 5 may be processed in a similar way and thus the table 540 may include data related to all the jumps in the jump path.

Further, a jump code may be determined for each jump in the jump path. For example, the jump code 550 shows jump codes for the jump 210, jump 220, jump 546, and jump null. Specifically, with respect to the jump in the table 540, a jump code may be determined based on the predecessor webpage, the successor webpage, and the jump probability. In FIG. 5, line 552 shows an example of the jump code. Here, the predecessor webpage may be represented by a predecessor code (for example, the ID "110" of the predecessor webpage), and the successor webpage may be represented by a successor code (for example, the ID "120" of the successor webpage). Then, the jump code may be determined by using the predecessor code, the successor code, and the jump probability.

In implementations of the present disclosure, the jump code may be represented as a sequence or a set including three elements as below: {the predecessor code, the successor code, the jump probability}. At this point, the jump code for the jump 210 may be represented as {110, 120, 0.3}, and the jump code for the jump 520 may be represented as {110, 140, 0.1}. Although the above paragraphs describe that codes for the webpages are represented in the decimal format, the codes may be represented in a binary format, an octal format, a hexadecimal format or even a string format.

In implementations of the present disclosure, a hash function may be performed on the predecessor code and the successor code to obtain a hash value HASH (predecessor code, successor code). Here, the hash function may be selected from the commonly used hash functions for converting two codes into a value in a predefined range (for example, an integer number). Alternatively and/or in addition to, the predecessor code and the successor code may be concatenated to one code, and then the concatenated code may be inputted into a hash function for mapping the code into a value in the predefined range. Further, the jump code may be determined based on the hash value and the jump probability. Specifically, for the jump 210, the jump code may be represented by {HASH (110, 120), 0.3}. Supposing HASH(110, 120)=3, then the jump code for the jump 210 may be represented as {3, 0.3}.

In implementations of the present disclosure, the jump code may be represented as a sequence or a set of two numbers "3" and "0.3." Alternatively and/or in addition to, the jump code may be represented in a different format. For example, a hash function may map the predecessor code, the successor code, and the jump probability into a value for representing the jump code in another range. At this point, the jump code may be represented by HASH (110, 120, 0.3) and then the jump code for the jump 210 may be indicated as a hash value of HASH (110, 120, 0.3), for example, "3" (or another value in the predefined range).

Figure 6:
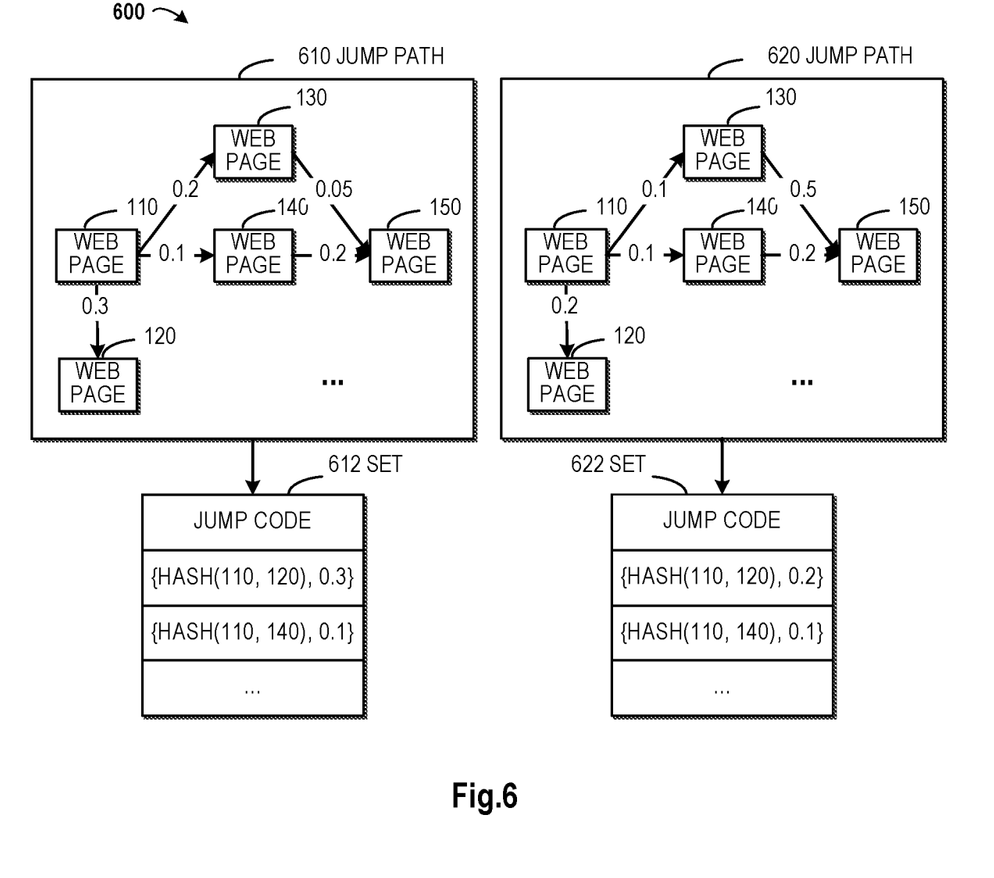
FIG. 6 illustrates an example diagram for determining a similarity between two websites according to implementations of the present disclosure.

In implementations of the present disclosure, the to-be-compared websites may go through the above procedure for determining their jump codes, respectively, and then jump codes for the two websites may be compared to determine the similarity between the two websites. FIG. 6 illustrates an example diagram 600 for determining a similarity between two websites according to implementations of the present disclosure. In FIG. 6, a jump path 610 and a jump path 620 may be determined for the first website and the second website, respectively. Then, each jump in the jump paths 610 and 620 may be processed, and then a set 612 of jump codes may be obtained for the first website and a set 622 of jump codes may be obtained for the second website.

Further, the sets 612 and 622 may be compared to determine the similarity. Specifically, the intersection over union (IoU) operation may be implemented on the two sets 612 and 622. Here, IoU also known as the Jaccard index, is a popular evaluation metric for comparison tasks. At this point, the similarity between the first and second websites may be determined based on the following Formula 1:

$$S(Website_1, Website_2) = Jaccard(L_1, L_2) = \frac{|L_1 \cap L_2|}{|L_1 \cup L_2|} = \frac{|L_1 \cap L_2|}{|L_1| + |L_2| - |L_1 \cap L_2|} \quad \text{Formula 1}$$

In Formula 1, $Website_1$ and $Website_2$ represent the first and second websites, respectively, S( ) represents a similarity between the first and second websites, Jaccard( ) represents the Jaccard index, $L_1$ and $L_2$ represent the jump code set for the first and second websites, respectively.

Figure 7:
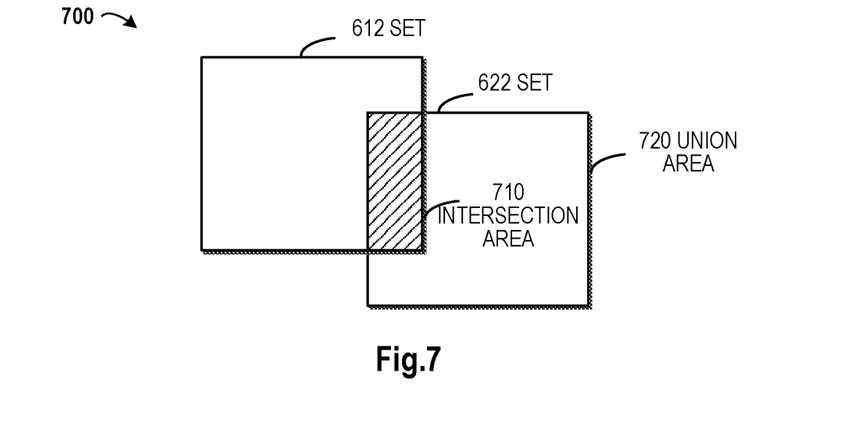
FIG. 7 illustrates an example diagram for determining an intersection over union for respective jump codes for two websites according to implementations of the present disclosure.

Referring to FIG. 7 for more details about the Jaccard index, here FIG. 7 illustrates an example diagram 700 for determining an intersection over union for respective jump codes for two websites according to implementations of the present disclosure. As shown in FIG. 7, an intersection area 710 represents the intersection between the set 612 and the set 622, and the union area 720 (including the area of both of the sets 612 and 622) represents the union of the set 612 and 622. Further, a ratio between the intersection 710 and union 720 may be used as the similarity between the first and second websites. Supposing both of the sets 612 and 622 include 200 jump codes, among which 100 jump codes are shared by the two sets, the similarity may be determined as: 100/(200+200−100)=⅓. With implementations of the present disclosure, the complex problem for detecting a similarity between two websites are converted into a simple mathematical problem. Therefore, the computation workload is greatly reduced, and the time cost is also lowered.

The above paragraphs have provided details for determining the similarity between websites. Once the similarity is determined, the similarity may be further used for building an association relationship between two websites and recommending a similar website and/or a similar webpage. For example, if a first webpage in the first website is a webpage of interest, then a second webpage in the second web site corresponding to the first webpage may be determined based on the similarity, and next the second webpage may be provided to a user who browses the first webpage in the first website.

Specifically, supposing a user is visiting an online shopping website A and wants to buy a product (such as a smart phone, and the like) via a webpage A1 (webpage of interest) in the website A. At this point, another website which is similar to the website A may be found for further recommendation. If it is determined that another online shopping B is very similar to the website A, then a webpage B1 in the website B (which also sells the smart phone and corresponds to the webpage A1) may be identified and recommended to the user. With these implementations, the similarity may facilitate the website comparison and then similar webpages in other similar websites may be recommended to the user. At this point, when the user is visiting the webpage A1 in the webpage A for a certain purpose, the similar webpage B1 in the similar website B may be automatically recommended to the user, and thus the user can directly visit the similar webpage B1 without a need to search the webpage B1 manually.

Figure 8:
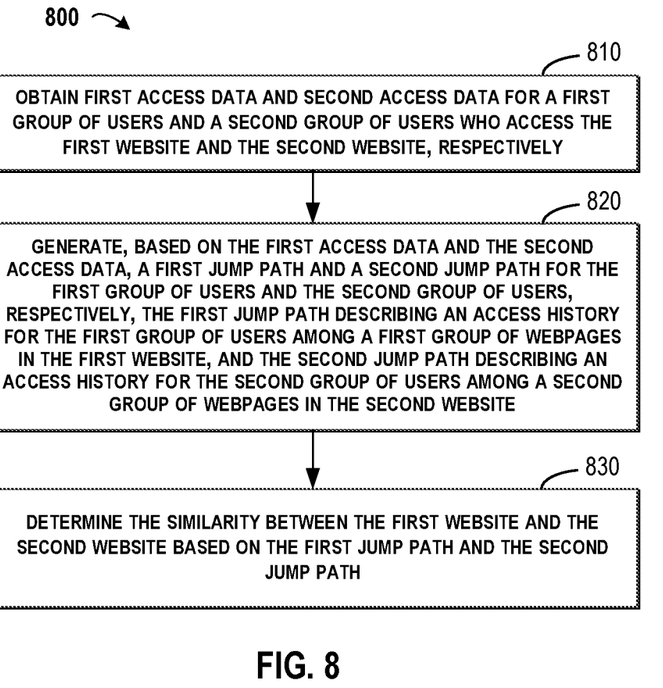
FIG. 8 illustrates an example flowchart of a method for determining a similarity between two websites based on access data according to implementations of the present disclosure.

The above paragraphs have described details for the similarity determination. According to implementations of the present disclosure, a method is provided for determining a similarity between a first website and a second website. Reference will be made to FIG. 8 for more details about the method, where FIG. 8 illustrates an example flowchart of a method for determining a similarity between two websites based on access data according to implementations of the present disclosure. At a block 810, first access data and second access data are obtained for a first group of users and a second group of users who access the first website and the second website, respectively. At a block 820, based on the first access data and the second access data, a first jump path and a second jump path are generated for the first group of users and the second group of users, respectively, the first jump path describing an access history for the first group of users among a first group of webpages in the first website, and the second jump path describing an access history for the second group of users among a second group of webpages in the second website. At a block 830, the similarity between the first website and the second website is determined based on the first jump path and the second jump path.

In implementations of the present disclosure, generating the first jump path based on the first access data comprises: determining, based on the first access data, the number of predecessor users in the first group of users who access a predecessor webpage in the first group of webpages; determining, based on the first access data, the number of successor users in the first group of users who jump from the predecessor webpage to a successor webpage that is linked to the predecessor webpage in the first group of webpages; and obtaining a jump in the first jump path based on the predecessor webpage, the successor webpage, the number of predecessor users, and the number of successor users.

In implementations of the present disclosure, obtaining the jump in the first jump path comprises: determining a jump probability for the jump based on the number of predecessor users and the number of successor users; and obtaining the jump based on the predecessor webpage, the successor webpage, and the jump probability.

In implementations of the present disclosure, the method 800 further comprises: in response to determining that the predecessor webpage is a predetermined webpage of interest in the first group of webpages, ceasing determining the first jump path.

In implementations of the present disclosure, determining the similarity between the first web site and the second web site comprises: determining respective first jump codes for respective jumps in the first jump path and respective second jump codes for respective jumps in the second jump path; and determining the similarity between the first website and the second web site based on the respective first jump codes and the respective second jump codes.

In implementations of the present disclosure, determining respective first jump codes for respective jumps in the first jump path comprises: with respect to the jump in the first jump path, determining a jump code for the jump based on the predecessor webpage, the successor webpage, and the jump probability.

In implementations of the present disclosure, determining the jump code for the jump comprises: obtaining a predecessor code for the predecessor webpage and a successor code for the successor webpage, respectively; and determining the jump code for the jump based on the predecessor code, the successor code, and the jump probability.

In implementations of the present disclosure, determining the jump code for the jump based on the predecessor code, the successor code, and the jump probability comprises: determining a hash value associated with the predecessor code and the successor code based on a hash operation; and determining the jump code for the jump based on the hash value and the jump probability.

In implementations of the present disclosure, determining the similarity between the first web site and the second web site based on the respective first jump codes and the respective second jump codes comprises: determining the similarity between the first website and the second website based on an intersection over union operation for the respective first jump codes and the respective second jump codes.

In implementations of the present disclosure, the method 800 further comprises: in response to determining that a first webpage in the first group of webpages is a webpage of interest, determining, in the second web site, a second webpage corresponding to the first webpage based on the similarity; and providing the second webpage to a user who browses the first webpage.

According to implementations of the present disclosure, an apparatus is provided for determining a similarity between a first website and a second website. The apparatus comprises: an obtaining unit, configured for obtaining first access data and second access data for a first group of users and a second group of users who access the first website and the second website, respectively; a generating unit, configured for generating, based on the first access data and the second access data, a first jump path and a second jump path for the first group of users and the second group of users, respectively, the first jump path describing an access history for the first group of users among a first group of webpages in the first web site, and the second jump path describing an access history for the second group of users among a second group of webpages in the second web site; and a determining unit, configured for determining the similarity between the first website and the second website based on the first jump path and the second jump path. Further, the apparatus may comprise other units for implementing other steps in the above method.

According to implementations of the present disclosure, an electronic device is provided for implementing the above method. The electronic device comprises: a computer processor coupled to a computer-readable memory unit, the memory unit comprising instructions that when executed by the computer processor implements a method for determining a similarity between a first website and a second website. The method comprises: obtaining first access data and second access data for a first group of users and a second group of users who access the first website and the second website, respectively; generating, based on the first access data and the second access data, a first jump path and a second jump path for the first group of users and the second group of users, respectively, the first jump path describing an access history for the first group of users among a first group of webpages in the first web site, and the second jump path describing an access history for the second group of users among a second group of webpages in the second website; and determining the similarity between the first web site and the second web site based on the first jump path and the second jump path.

In implementations of the present disclosure, generating the first jump path based on the first access data comprises: determining, based on the first access data, the number of predecessor users in the first group of users who access a predecessor webpage in the first group of webpages; determining, based on the first access data, the number of successor users in the first group of users who jump from the predecessor webpage to a successor webpage that is linked to the predecessor webpage in the first group of webpages; and obtaining a jump in the first jump path based on the predecessor webpage, the successor webpage, the number of predecessor users, and the number of successor users.

In implementations of the present disclosure, obtaining the jump in the first jump path comprises: determining a jump probability for the jump based on the number of predecessor users and the number of successor users; and obtaining the jump based on the predecessor webpage, the successor webpage, and the jump probability.

In implementations of the present disclosure, the method further comprises: in response to determining that the predecessor webpage is a predetermined webpage of interest in the first group of webpages, ceasing determining the first jump path.

In implementations of the present disclosure, determining the similarity between the first web site and the second web site comprises: determining respective first jump codes for respective jumps in the first jump path and respective second jump codes for respective jumps in the second jump path; and determining the similarity between the first website and the second web site based on the respective first jump codes and the respective second jump codes.

In implementations of the present disclosure, determining respective first jump codes for respective jumps in the first jump path comprises: with respect to the jump in the first jump path, determining a jump code for the jump based on the predecessor webpage, the successor webpage, and the jump probability.

In implementations of the present disclosure, determining the jump code for the jump comprises: obtaining a predecessor code for the predecessor webpage and a successor code for the successor webpage, respectively; and determining the jump code for the jump based on the predecessor code, the successor code, and the jump probability.

In implementations of the present disclosure, determining the jump code for the jump based on the predecessor code, the successor code, and the jump probability comprises: determining a hash value associated with the predecessor code and the successor code based on a hash operation; and determining the jump code for the jump based on the hash value and the jump probability.

In implementations of the present disclosure, determining the similarity between the first web site and the second web site based on the respective first jump codes and the respective second jump codes comprises: determining the similarity between the first website and the second website based on an intersection over union operation for the respective first jump codes and the respective second jump codes.

In implementations of the present disclosure, the method further comprises: in response to determining that a first webpage in the first group of webpages is a webpage of interest, determining, in the second web site, a second webpage corresponding to the first webpage based on the similarity; and providing the second webpage to a user who browses the first webpage.

According to implementations of the present disclosure, a computer program product, the computer program product comprising a computer readable storage medium having program instructions embodied therewith, the program instructions executable by an electronic device to cause the electronic device to perform the method.

Figure 9:
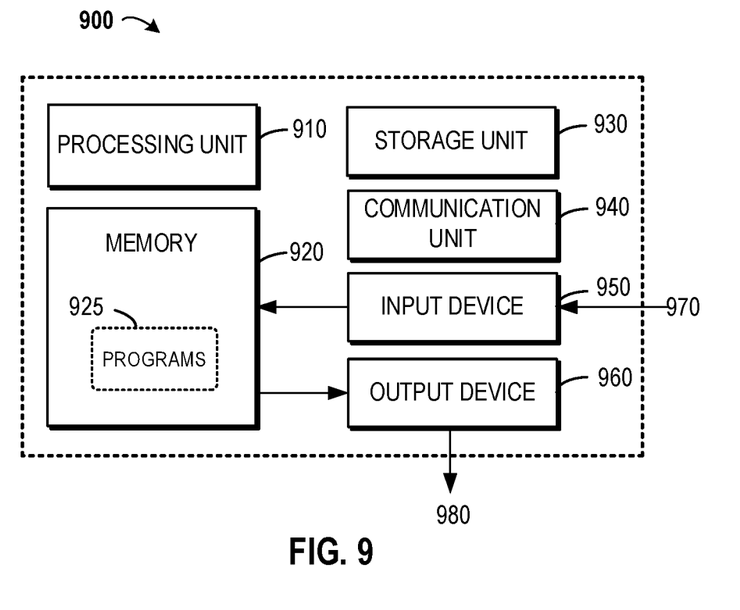
FIG. 9 illustrates a block diagram of a computing device in which various implementations of the present disclosure can be implemented.

FIG. 9 illustrates a block diagram of a computing device 900 in which various implementations of the present disclosure can be implemented. It would be appreciated that the computing device 900 shown in FIG. 9 is merely for purpose of illustration, without suggesting any limitation to the functions and scopes of the present disclosure in any manner. The computing device 900 may be used to implement the above method 1000 in implementations of the present disclosure. As shown in FIG. 9, the computing device 900 may be a general-purpose computing device. The computing device 900 may at least comprise one or more processors or processing units 910, a memory 920, a storage unit 930, one or more communication units 940, one or more input devices 950, and one or more output devices 960.

The processing unit 910 may be a physical or virtual processor and can implement various processes based on programs stored in the memory 920. In a multi-processor system, multiple processing units execute computer executable instructions in parallel so as to improve the parallel processing capability of the computing device 900. The processing unit 910 may also be referred to as a central processing unit (CPU), a microprocessor, a controller, or a microcontroller.

The computing device 900 typically includes various computer storage medium. Such medium can be any medium accessible by the computing device 900, including, but not limited to, volatile and non-volatile medium, or detachable and non-detachable medium. The memory 920 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 930 may be any detachable or non-detachable medium and may include a machine-readable medium such as a memory, flash memory drive, magnetic disk, or another other media, which can be used for storing information and/or data and can be accessed in the computing device 900.

The computing device 900 may further include additional detachable/non-detachable, volatile/non-volatile memory medium. Although not shown in FIG. 9, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 940 communicates with a further computing device via the communication medium. In addition, the functions of the components in the computing device 900 can be implemented by a single computing cluster or multiple computing machines that can communicate via communication connections. Therefore, the computing device 900 can operate in a networked environment using a logical connection with one or more other servers, networked personal computers (PCs) or further general network nodes.

The input device 950 may be one or more of a variety of input devices, such as a mouse, keyboard, tracking ball, voice-input device, and the like. The output device 960 may be one or more of a variety of output devices, such as a display, loudspeaker, printer, and the like. By means of the communication unit 940, the computing device 900 can further communicate with one or more external devices (not shown) such as the storage devices and display device, with one or more devices enabling the user to interact with the computing device 900, or any devices (such as a network card, a modem, and the like) enabling the computing device 900 to communicate with one or more other computing devices, if required. Such communication can be performed via input/output (I/O) interfaces (not shown).

In some implementations, instead of being integrated in a single device, some, or all components of the computing device 900 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described, and other implementations, enhancements and variations can be made based on what is described and illustrated in the present disclosure.

What is claimed is:

1. A method for determining a similarity between a first web site and a second web site, comprising:
   obtaining first access data and second access data for a first group of users and a second group of users who access the first website and the second website, respectively;
   generating, based on the first access data and the second access data, a first jump path and a second jump path for the first group of users and the second group of users, respectively, the first jump path describing an access history for the first group of users among a first group of webpages in the first web site, and the second jump path describing an access history for the second group of users among a second group of webpages in the second website; and
   determining the similarity between the first website and the second website based on an intersection over union operation for jumps in the first jump path and jumps in the second jump path.

2. The method of claim 1, wherein generating the first jump path based on the first access data comprises:
   determining, based on the first access data, the number of predecessor users in the first group of users who access a predecessor webpage in the first group of webpages;
   determining, based on the first access data, the number of successor users in the first group of users who jump from the predecessor webpage to a successor webpage that is linked to the predecessor webpage in the first group of webpages; and
   obtaining a jump in the first jump path based on the predecessor webpage, the successor webpage, the number of predecessor users, and the number of successor users.

3. The method of claim 2, wherein obtaining the jump in the first jump path comprises:
   determining a jump probability for the jump based on the number of predecessor users and the number of successor users; and
   obtaining the jump based on the predecessor webpage, the successor webpage, and the jump probability.

4. The method of claim 2, further comprising: in response to determining that the predecessor webpage is a predetermined webpage of interest in the first group of webpages, ceasing determining the first jump path.

5. The method of claim 3, wherein determining the similarity between the first website and the second website comprises:
   determining respective first jump codes for respective jumps in the first jump path and respective second jump codes for respective jumps in the second jump path; and
   determining the similarity between the first website and the second website based on the respective first jump codes and the respective second jump codes.

6. The method of claim 5, wherein determining respective first jump codes for respective jumps in the first jump path comprises:
   with respect to the jump in the first jump path, determining a jump code for the jump based on the predecessor webpage, the successor webpage, and the jump probability.

7. The method of claim 6, wherein determining the jump code for the jump comprises:
   obtaining a predecessor code for the predecessor webpage and a successor code for the successor webpage, respectively; and
   determining the jump code for the jump based on the predecessor code, the successor code, and the jump probability.

8. The method of claim 7, wherein determining the jump code for the jump based on the predecessor code, the successor code, and the jump probability comprises:
   determining a hash value associated with the predecessor code and the successor code based on a hash operation; and
   determining the jump code for the jump based on the hash value and the jump probability.

9. The method of claim 5, wherein determining the similarity between the first website and the second website based on the respective first jump codes and the respective second jump codes comprises:
   determining the similarity between the first website and the second website based on an intersection over union operation for the respective first jump codes and the respective second jump codes.

10. The method of claim 1, further comprising: in response to determining that a first webpage in the first group of webpages is a webpage of interest,
    determining, in the second website, a second webpage corresponding to the first webpage based on the similarity; and
    providing the second webpage to a user who browses the first webpage.

11. An electronic device, comprising a computer processor coupled to a computer-readable memory unit, the memory unit comprising instructions that when executed by the computer processor implements a method for determining a similarity between a first web site and a second web site, the method comprising:
    obtaining first access data and second access data for a first group of users and a second group of users who access the first website and the second website, respectively;
    generating, based on the first access data and the second access data, a first jump path and a second jump path for the first group of users and the second group of users, respectively, the first jump path describing an access history for the first group of users among a first group of webpages in the first web site, and the second jump path describing an access history for the second group of users among a second group of webpages in the second website; and
    determining the similarity between the first website and the second website based on an intersection over union operation for jumps in the first jump path and jumps in the second jump path.

12. The device of claim 11, wherein generating the first jump path based on the first access data comprises:
    determining, based on the first access data, the number of predecessor users in the first group of users who access a predecessor webpage in the first group of webpages;
    determining, based on the first access data, the number of successor users in the first group of users who jump from the predecessor webpage to a successor webpage that is linked to the predecessor webpage in the first group of webpages; and
    obtaining a jump in the first jump path based on the predecessor webpage, the successor webpage, the number of predecessor users, and the number of successor users.

13. The device of claim 12, wherein obtaining the jump in the first jump path comprises:
    determining a jump probability for the jump based on the number of predecessor users and the number of successor users; and
    obtaining the jump based on the predecessor webpage, the successor webpage, and the jump probability.

14. The device of claim 12, wherein the method further comprises: in response to determining that the predecessor webpage is a predetermined webpage of interest in the first group of webpages, ceasing determining the first jump path.

15. The device of claim 13, wherein determining the similarity between the first website and the second website comprises:
    determining respective first jump codes for respective jumps in the first jump path and respective second jump codes for respective jumps in the second jump path; and
    determining the similarity between the first website and the second website based on an intersection over union operation for the respective first jump codes and the respective second jump codes.

16. The device of claim 15, wherein determining respective first jump codes for respective jumps in the first jump path comprises:
  with respect to the jump in the first jump path, determining a jump code for the jump based on the predecessor webpage, the successor webpage, and the jump probability.

17. The device of claim 16, wherein determining the jump code for the jump comprises:
  obtaining a predecessor code for the predecessor webpage and a successor code for the successor webpage, respectively; and
  determining the jump code for the jump based on the predecessor code, the successor code, and the jump probability.

18. The device of claim 17, wherein determining the jump code for the jump based on the predecessor code, the successor code, and the jump probability comprises:
  determining a hash value associated with the predecessor code and the successor code based on a hash operation; and
  determining the jump code for the jump based on the hash value and the jump probability.

19. The device of claim 11, further comprising: in response to determining that a first webpage in the first group of webpages is a webpage of interest,
  determining, in the second website, a second webpage corresponding to the first webpage based on the similarity; and
  providing the second webpage to a user who browses the first webpage.

20. A computer program product, the computer program product comprising a non-transitory computer readable storage medium having program instructions embodied therewith, the program instructions executable by an electronic device to cause the electronic device to perform a method for determining a similarity between a first website and a second website, the method comprises:
  obtaining first access data and second access data for a first group of users and a second group of users who access the first website and the second website, respectively;
  generating, based on the first access data and the second access data, a first jump path and a second jump path for the first group of users and the second group of users, respectively, the first jump path describing an access history for the first group of users among a first group of webpages in the first website, and the second jump path describing an access history for the second group of users among a second group of webpages in the second website; and
  determining the similarity between the first website and the second website based on an intersection over union operation for jumps in the first jump path and jumps in the second jump path.

* * * * *